Jan. 18, 1949.                L. C. PHARO                    2,459,240
                           ASBESTOS FIBERIZING
Filed Oct. 12, 1943                                     3 Sheets-Sheet 3

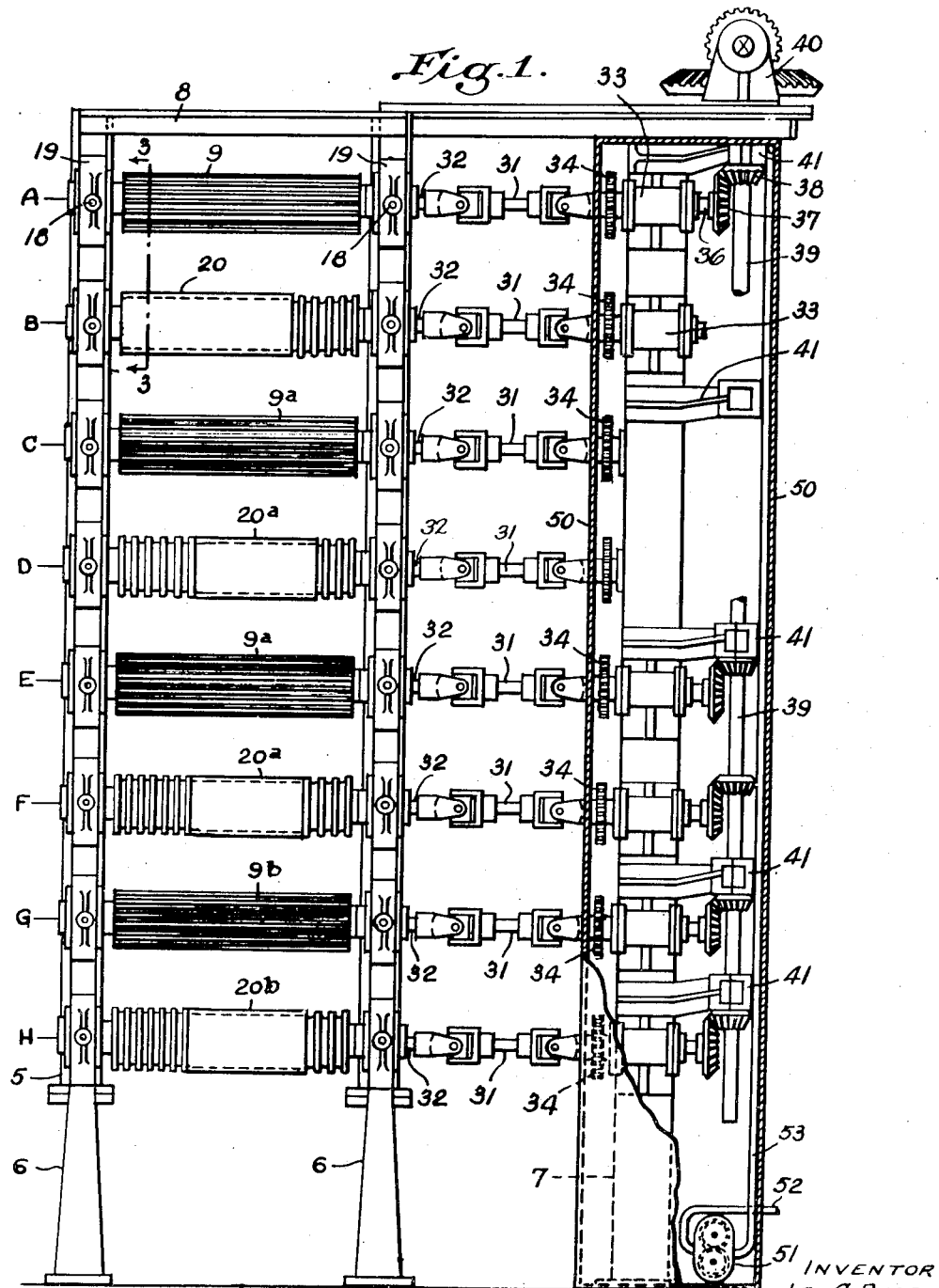

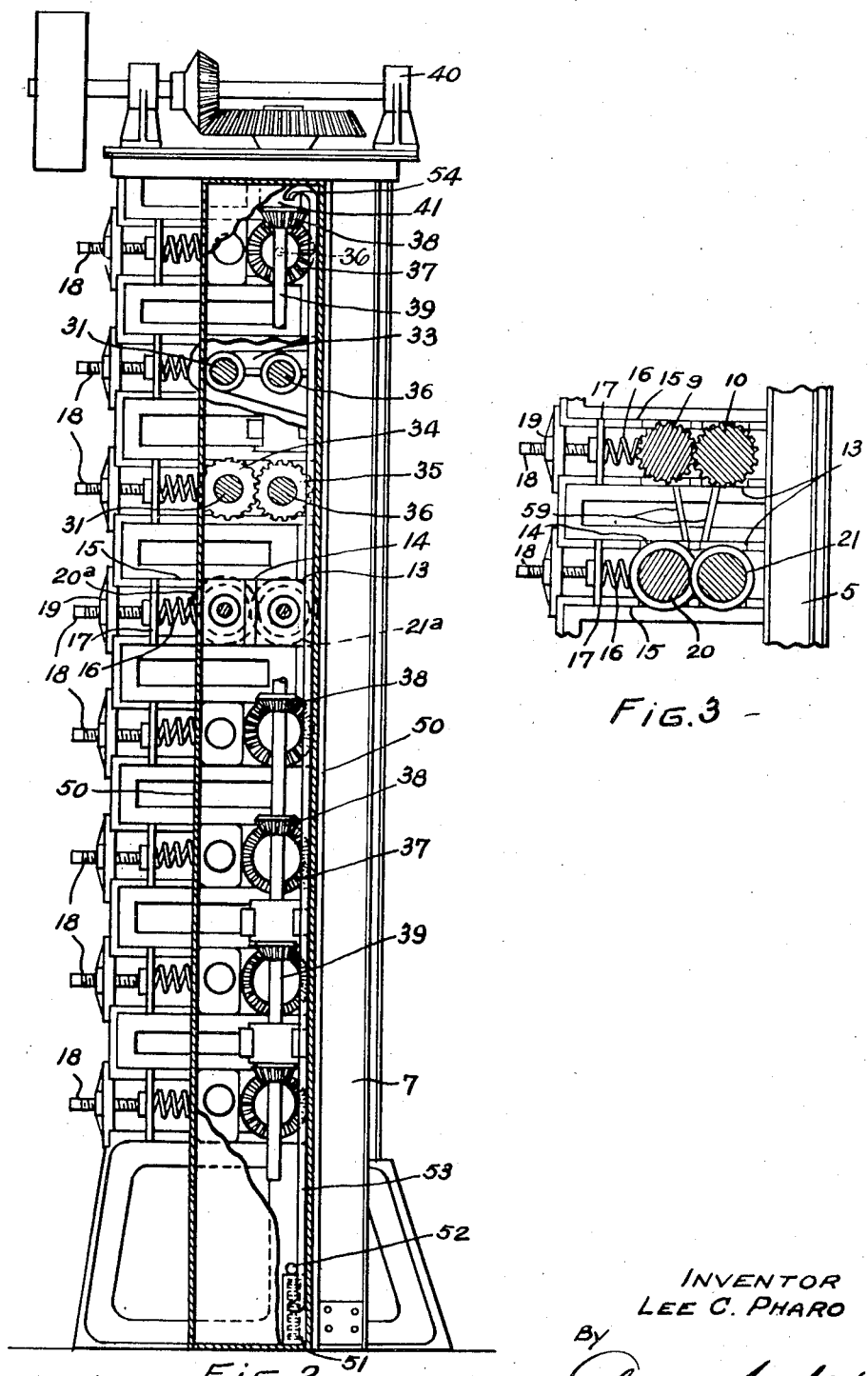

INVENTOR
LEE C. PHARO
BY
Alan Ausobey
ATTORNEY

Patented Jan. 18, 1949

2,459,240

UNITED STATES PATENT OFFICE 2,459,240

ASBESTOS FIBERIZING

Lee C. Pharo, Thetford Mines, Quebec, Canada, assignor to Johnson's Company, Thetford Mines West, Quebec, Canada Application October 12, 1943, Serial No. 505,999

1 Claim. (Cl. 19—65)

INTRODUCTION

This invention relates to a method of treating asbestos masses containing spicules of crude asbestos, to effect fiberizing, that is to say, the loosening of the fibers from the composite state in which they occur naturally.

OBJECTS

It is a principal object of this invention to provide a process in which the fiberization of both long and short spicules in the masses is substantially complete. It is a further object of this invention to provide such a process in which injury to the fibers is reduced substantially to a minimum. It is a still further object of the invention to provide apparatus for carrying out such processes.

DETAILED DESCRIPTION

The applicant has found that, generally speaking, masses of asbestos, after being separated from the rock in which they occur naturally, can be fiberized by flexure in various directions preferably under pressure. This can be done for instance by corrugating the masses between mating surfaces provided respectively with ribs and intervening grooves. Such treatment has the effect of "opening" the spicules by loosening the adhering fibers. The applicant has also found, however, that undue flexure of the masses causes breakage of the individual fibers and that, for instance, spicules should only be flexed in one curvature over the whole length of the spicule at one time. In other words, the spicule should not cover more than one corrugation of the fiberizing rolls in the first flexing, as the idea of fiberizing by bending or flexing the spicule is to put the fibers on the outside of the spicule under tension sufficient to cause them to pull away from the main spicule. Therefore, should the spicule be long enough to cover two corrugations the fibers on the outside of the curvature will be held by the reverse corrugation and will not be free to pull away from the main body of the spicule, and due to the tension are l:kely to break. Where the masses contain spicules of relatively long fibers and these spicules are, during corrugation, flexed through more than a single reversing curvature at one time or through too acute a curvature, breakage of many individual fibers occurs. Since the mass of asbestos to be treated generally contains at the same time spicules made up of long fibers, those made up of fibers of intermediate length, and those made up of short fibers, it is a problem to achieve reasonably complete fiberization, without injury to the longer fibers.

The applicant has discovered, however, that where the masses are flexed so that the longer spicules are not flexed through more than one reversing curvature of moderate radius at one time, these longer spicules may thus be opened, but that this is not effective to open the spicules of shorter fibers. However, once the masses have been treated so that the longer fibers have been loosened, these fibers can be subjected to a treatment in which they are flexed through several reversing curvatures of relatively acute radii. Consequently, it is possible to subject the entire masses to successive corrugating steps in which the curvatures of flexure are of progressively decreasing radii. Moreover, continued experiments have led to the discovery that the masses can, after suitable preconditioning by relatively coarse corrugation, be subjected without injury to corrugation so fine that even the spicules containing the shortest fibers can be opened. The mass can thus be substantially completely fiberized by this method without injury to the longer fibers as would previously have been thought a necessary incident to such treatment.

This method can conveniently be accomplished by passing the masses serially between at least three successive sets of mating pairs of ribbed rolls, between which they are subjected to the fiberizing pressure and flexure. Usually, alternate pairs if rolls are provided respectively with longitudinally extending ribs and circumferentially extending ribs. According to the present invention a primary set of coarsely corrugated rolls is provided with relatively large interfitting longitudinal ribs and grooves so calibrated to the masses as to fiberize the spicules of longer fibers without injuring them. A further set of rolls are provided with finer ribbing and calibrated to spicules of intermediate fiber length. A still further set of finely corrugated rolls is provided which are calibrated to the spicules containing the shortest fibers in the masses. By proper calibration of the ribs and grooves of the respective sets of rolls to the masses being treated, substantially complete fiberization may be effected as will become clear from the following detailed description.

In order that the invention may be more fully understood, reference will now be made to the accompanying drawings illustrating an apparatus on which a preferred embodiment of the method may be carried out, and in which:

Figure 1 is a front elevation of this apparatus.

Figure 2 is a side elevation of the apparatus shown in Figure 1.

Figure 3 is a sectional view taken along the line 3—3 of Figure 1.

Figure 4:
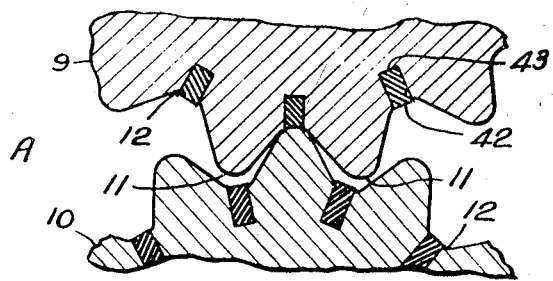
Figures 4 to 9 are enlarged fragmentary cross sections through the pairs of rolls A, B, C, D, G and H, respectively, the sections through the circumferentially ribbed rolls being taken axially and the sections through the longitudinally ribbed rolls being taken transversely of the axes thereof.
Figure 5:
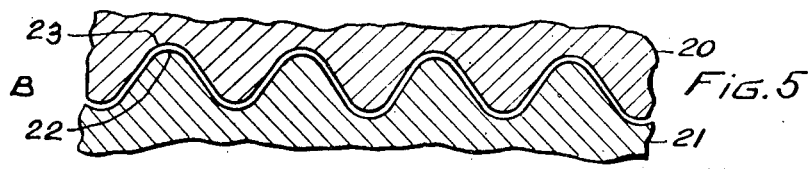

Referring more particularly to the drawings, 5 designates a frame supported in an upright position by base portions 6, said frame carrying a plurality of pairs of rolls indicated at A, B, C, D, E, F, G and H. 7 designates an upright support to which the driving mechanism hereinafter described is secured. A top plate or bar 8 is secured to the frame 5 and supports 7 to hold them in their relative vertical positions.

The rolls 9 and 10 of the pair A are provided with large parallel longitudinally extending ribs 11 defining therebetween large longitudinal grooves 12, said ribs and grooves being transversely curved as shown in subsequent figures. The two rolls 9 and 10 are mounted to lie in the same horizontal plane with the ribs 11 of one roll fitted in the grooves 12 of the companion roll. The rolls may, therefore, be said to be in mating relationship. To this end, the rolls 10 are journalled in stationary bearings 13 while the roll 9 is journalled in sliding bearings 14 working in suitable bearing guides 15 secured to the frame 5. Springs 16 are confined by the bearings 14 and suitable spring sets 17 and serve to yieldingly press the roll 9 against the roll 10. Adjusting screws 18 are threaded through a cap portion of the bearing guides 15. These screws 18 bear against spring sets 17 and are adjusted to regulate the compression of the spring 16. To prevent clogging of the grooves 12, a rubber strip 42 is fitted in a recess 43 at the bottom of each groove. The rubber strip preferably extends slightly beyond the contour of the groove 12. As the rolls rotate the strips 42 are compressed by the rib 11. As the ribs leave the groove, the rubber strips in expanding to their original position act as adjustors to clear the bottom of the grooves of the fiber that might otherwise remain therein.

The rolls 20 and 21 of the pair B are provided with large equi-spaced annular ribs 22 defining large intervening annular grooves 23, said ribs and grooves extending around the rolls at right angles to the axes thereof and being transversely curved as shown in subsequent figures. These rolls 20 and 21 are also mounted to lie in the same horizontal plane with the ribs 22 of one roll fitted in the grooves 23 of the companion rolls. As here shown, the mounting of the rolls 20 and 21 is similar to that described in connection with the rolls 9 and 10. The roll 21 is journalled in stationary bearings 13 while roll 20 is journalled in slide bearings 14 working in bearing guides 15 secured to the frame 5. The roll 20 is pressed toward roll 21 by springs 16 confined between bearings 14 and spring seat members 17, the compression of the springs being regulated by suitable adjusting screws 18 through cap portions 19. Rubber strips similar to those provided in the grooves of the rolls 9 and 10 may also be arranged in the grooves of the rolls 20 and 21 if this is found to be necessary or desirable. It will be noted that the rolls 20 and 21 of the pair B have been journalled in bearings and held in place by spring and seat members which are numbered the same as those bearings, spring and seat members mentioned in connection with rolls 9 and 10. The reason for the use of the same numbers is that the bearings, spring and seat members, etc. are identical in each and every set throughout the apparatus.

One end of a universally-jointed shaft 31 is secured to one end of the shaft of roll 9 as indicated at 32. The other end of the universally-jointed shaft 31 is mounted in a housing 33 secured to the support member 7 and is provided with a spur gear 34 adjacent thereto. This gear 34 meshes with a similar gear 35 fixed to a corresponding universally-jointed shaft 36 which is secured to one end of the companion roll 10. The universally-jointed shaft 36 is mounted in the same housing 33 in alignment with the universally-jointed shaft 31 and adjacent to the support member 7. Said shaft 36 extends beyond the housing and is provided at its outer end with a bevelled crown gear 37 meshing with a bevel pinion gear 38 mounted on a vertical shaft 39, which is rotatably driven by suitable power mechanism 40 mounted on top of the plate 8. Brackets 41 secured to support 7 hold the vertical shaft 39 in place.

It will thus be seen that the vertical power driven shaft 39 rotates the roll 10 through the universally-jointed shaft 36 in one direction and drives the roll 9 through the universally-jointed shaft 31 by the combination of the spur gears in the opposite direction. The object of providing the rolls 9 and 10 with universally-jointed drive shafts is to maintain the two rolls in constant parallel relation with one another.

The rolls 20 and 21 are connected to universally-jointed shafts 31 and 36 and the mechanical structure and operation is identical with the mechanical structure and operation of the rolls 9 and 10.

Figure 6:
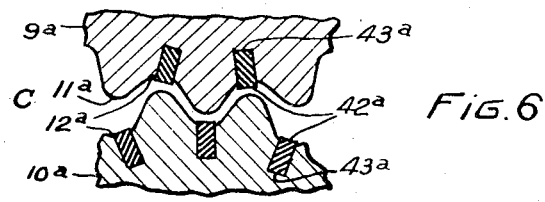

The rolls 9a and 10a of each set C are provided with relatively small parallel longitudinally extending ribs 11a defining relatively smaller intervening longitudinal grooves 12a; said ribs and grooves being transversely curved as shown in Figure 6. These rolls 9a and 10a are likewise mounted to lie in the same horizontal plane with the ribs 11a of one roll fitted in the grooves 12a of the companion roll. The mounting of the rolls 9a and 10a is the same as described in connection with the rolls 9 and 10. The roll 10a is journalled in stationary bearings 13 while the roll 9a is journalled in sliding bearings 14 working in bearing guides 15 secured to the frame 5. These rolls 9a and 10a are held together in exactly the same manner as heretofore described in connection with rolls 9 and 10 and rolls 20 and 21. To prevent clogging of the grooves 12a rubber strips 42a are fitted in recesses 43a at the bottom of the grooves 12a for the same purpose as described in connection with rolls 9 and 10.

Figure 7:

The rolls 20a and 21a of each pair D are provided with relatively smaller equi-spaced annular ribs 22a defining relatively small intervening grooves 23a; said ribs and grooves extending around the rolls at right angles to the axes thereof and being transversely curved as shown in Figure 7. These rolls 20a and 21a are also mounted to lie in the same horizontal plane with the ribs 22a of one roll fitted in the grooves 23a of the companion roll. The mounting of the rolls 20a and 21a is also the same as described in connection with rolls 9 and 10 and rolls 20 and 21.

The rolls of each pair C and D are connected to universally-jointed shafts 31 and 36 and the mechanical structure and operation is identical with the mechanical structure and operation of the rolls 9 and 10.

Figure 8:
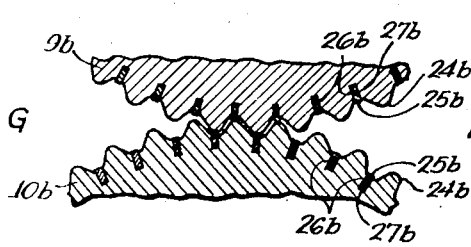

The pairs of rolls E and G are similar to the rolls A but dimensioned as described below. The pairs of rolls D, F and H are similar to the rolls B but are dimensioned as described below. Each of the pair of rolls G of Figure 8, comprising the roll 9b and roll 10b is provided with large parallel longitudinally extending ribs 24b defining therebetween large longitudinal grooves 25b, said ribs and grooves being transversely curved, as shown. To prevent clogging of the grooves 28b, a rubber strip 26b is fitted in a recess 27b at the bottom of each groove, as shown.

Figure 9:
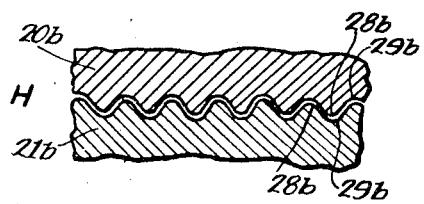

Each of the pair of rolls H of Figure 9, comprising the roll 20b and roll 21b is provided with large equally spaced annular ribs 28b defining large intervening annular grooves 28b, said ribs and grooves extending around the rolls at right angles to the axes thereof, and being transversely curved, as shown.

To facilitate lubrication of the drive mechanism, a casing 50 encloses the various drive gears and shafts as indicated in the drawings. For the sake of clarity, this casing has been sectioned and broken away but its utilization in the present connection will be well understood by one skilled in the art. Within the casing 50 is an oil pump 51 connected by a pipe 52 to a suitable source of oil supply. The pressure side of the pump is connected to a pipe 53 extending upwards to an outlet 54 adjacent the top of the casing. The pump 51 is operated to force oil through the outlet 54 on to the uppermost gear 38 which acts to disperse the oil on to the lower gears. Enclosing the gears in this manner serves to keep them free from dust and particles of asbestos.

If desired, deflector means 59 may be arranged between the several sets of rolls so that material passing through the nip of one set is guided towards the nip of the next lower set. These deflectors may be supported by the bearing guides or in any other convenient manner.

In order that the method of the present invention may be carried out in the apparatus described, the rolls are preferably dimensioned as follows. The grooves of the rolls in the pair A are so dimensioned that the distance measured on the surface of these rolls between the apices of adjacent ribs is such that this distance exceeds slightly the length of the greatest portion of all the longest fibers in the asbestos. The pair of rolls B are dimensioned likewise.

The third, fourth, fifth and sixth pairs of rolls are dimensioned so that the distance measured on the surface of the rolls between the apices of adjacent ribs exceeds slightly the length of the greater portion of fibers of intermediate length in the masses. The seventh and eighth pairs of rolls are dimensioned so that the distance measured on the surface of the rolls between the apices of adjacent ribs exceeds slightly the length of the greater portion of the shortest fibers in the asbestos.

Usually the asbestos treated, for instance, chrysotile asbestos, varies in fiber length from about 2½ inches down to the shortest lengths which can be employed for textile use. A characteristic apparatus, therefore, would be one in which the distance on the surface of the rolls between the apices of adjacent ribs would be respectively in the neighborhood of the following, coarse rolls 2½ inches, intermediate rolls 1½ inches, fine rolls ½ inch. Where longer fibers are being treated it may not be practical to employ rolls sufficiently coarsely ribbed to handle spicules of the largest fibers without breaking the fibers. However, extremely long fibers are not generally an advantage and so their breakage into shorter fibers is not a disadvantage.

OPERATION

The asbestos is taken after the removal of the rock therefrom and after the large lumps of asbestos have been reduced to spicules. Usually, the masses will contain spicules of various lengths. The purpose of the present treatment is to loosen the fibers in their respective spicules to separate them one from the other so that the fiber may be treated in a grader, in an apparatus employing compressed air or by any other means of "teasing" the fibers.

When the masses are passed through the rolls the treatment is as follows. The first set of rolls, that is, the first and second pairs, corrugate the masses first laterally and then longitudinally. Owing to the coarse ribbing, that is, the distance between the apices of the ribs of these rolls and the relatively oblique curvature, most of the spicules of long fiber are only flexed through a single curvature at a time and none of these long spicules are flexed through more than one reversing curvature. This has the effect of loosening the long fibers in these spicules without breaking them. Then the material is passed through the second set of rolls, that is the third through the sixth pairs, which likewise loosen the fibers of intermediate length without injury thereto. In this operation many of the longer fibers will be flexed through several reversing curvatures, but since the spicules containing the longer fibers have already been opened by treatment in the first set of rolls they are capable of being thus flexed without injury thereto.

Finally the material is passed through the fine set of rolls made up of the pairs G and H in which the ribs are smaller and close together. Treatment by these rolls has the effect of fiberizing the very short spicules, that is, those shorter than would be effectively flexed by the previous sets of rolls. Unexpectedly, the longer fibers, although flexed several times over the closely spaced ribs and intervening grooves are not ruptured or damaged.

It is thus seen that the masses are progressively fiberized from the longest fibers to the shortest fibers, to a substantially completely fiberized state. Substantially the entire mass of starting fiber is retained in the end product, there remaining under preferred conditions a minimum of unfiberized spicules.

EXAMPLES

In order that the invention may be understood in a still more specific sense, actual treatment of batches of asbestos in practice will be described in the following examples.

EXAMPLE 1

Apparatus similar to that illustrated in the drawings and in which the rolls were of substantially the following dimensions was employed.

| Rolls | Roll dimension, i. e. diameter between outer circumferences | Straight line distance between apices of ribs | Form of ribs and grooves |
|---|---|---|---|
| | Inches | Inches | |
| A | 6½ | 1½ | Substantially as shown in drawings. |
| B | 6½ | 1½ | Do. |
| C | 6½ | 1 | Do. |
| D | 6½ | 1 | Do. |
| E | 6½ | 1 | Do. |
| F | 6½ | 1 | Do. |
| G | 6½ | ½ | Do. |
| H | 6½ | ½ | Do. |

One ton of chrysotile asbestos milled fiber including respective spicules containing fiber running from about 2½ inches staple down to substantially the smallest fiber used for textiles was treated. This material was passed through the rolls A to H as described above in about one hour. The rolls were operated at about 240 feet per minute rim speed. The material was fed to substantially the full width of the rolls in masses of a thickness of about ½ inch. The material discharged from the last set of rolls was about ¼ inch in thickness.

Inspection of these treated masses showed that they had been substantially completely fiberized. That is to say, the masses after treatment in a grader or subjected to an air blast to liberate the fibers were suitable for textile use, without having to resort to separation therefrom of small spicules of crudy fiber. Roving made from these fiberized masses was, with the usual addition of cotton, spun into high grade yarn.

EXAMPLE 2

One ton of asbestos of the type treated in Example 1 was passed through an apparatus as in Example 1 with the exception that the grooving of the rolls G and H instead of being finer was of the same calibration as the grooving of the rolls C and D. This fiberized material was then treated with a spicule removing device and about 4½% by weight of the fiber removed as spicules of short fibers.

A ton of the same asbestos was passed through the apparatus in which the grooving of the rolls was as in Example 1. This fiberized material was then subjected to the same fiber-removing operation as in the previous paragraph, but less than about 0.5% by weight of the total mass was removed as small spicules. As far as breakage of the long fibers was concerned, both masses were substantially identical, i. e. there was very little breakage.

This example indicates the effectiveness of the finely-ribbed rolls in fiberizing the smaller spicules of fiber without injury to the longer fibers already fiberized by the coarser-ribbed rolls.

END OF EXAMPLES

Advantages

A principal advantage of the present invention is that by its application, substantially complete fiberization of asbestos masses having both long and short spicules may be accomplished. The applicant has found that the fibers from the short specules which have normally been discarded do not undesirably effect the spinning qualities of the fiberized masses unless they are present in great quantities since the cotton added during textile operations will carry a reasonable proportion of short fibers through the spinning operation. Consequently, by the use of the present invention, considerable loss in weight of fiber which would be experienced by withdrawing from the masses spicules of short fibers is avoided and the yield from a given quantity of fiber is increased. Other advantages will occur to those skilled in the art.

The term "spicules" is used to describe the bundles of fibers which persist in their natural composite state. These vary in length depending upon the size of the vein in which they are taken from the rock. The term "open" is used to define the action of breaking down a spicule so as to loosen therein the individual fibers so that they can be liberated for textile use. The term "fiberizing" is used to define in general the opening of the spicules throughout the mass. The term "corrugated" is intended to define the condition in which the masses find themselves when subjected to the exertion of flexure under pressure characteristic of the present invention and as described above.

It will be understood that, without departing from the spirit of the invention or the scope of the claim, various modifications may be made in the specific expedients described. The latter are illustrative only and not offered in a restricting sense, it being desired that only such limitations shall be placed thereon as may be required by the state of the prior art.

The sub-titles used throughout the specification are merely to simplify reference thereto and should otherwise be disregarded.

I claim:

An asbestos fiberizing apparatus, comprising, a plurality of sets of rolls aligned to act successively on masses of asbestos during their passage through the apparatus, each set including a pair of companion rolls presenting inter-fitting longitudinal extending ribs and grooves, each set also including an alternate pair of companion rolls presenting interfitting circumferentially extending ribs and grooves, there being such sets of rolls wherein the distance on the surfaces of the rolls between the apices of adjacent ribs is about 2½ inches and the ribs and grooves are effective to flex the longest spicules without injury to the fiber, succeeding sets of rolls having a distance on the surfaces of the rolls between the apices of adjacent ribs of about 1½ inches whereby the ribs and grooves are effective to flex fibers of intermediate length without injury to the longer fibers, and final sets of rolls having a distance on the surfaces of the rolls between the apices of adjacent ribs of about ½ inch whereby the rolls are adapted to flex fibers of the shortest length without injury to the longer or intermediate fibers.

L. C. PHARO.

REFERENCES CITED

The following references are of record in the file of this patent:

UNITED STATES PATENTS

| Number | Name | Date |
|---|---|---|
| 494,176 | Smith | Mar. 28, 1893 |
| 2,219,077 | Pharo | Oct. 22, 1940 |